(12) United States Patent
Song et al.

(10) Patent No.: US 12,523,284 B2
(45) Date of Patent: Jan. 13, 2026

(54) TRANSMISSION MECHANISM FOR ROTARY JOINT, ROBOT JOINT AND ROBOT

(71) Applicant: SHANGHAI FLEXIV ROBOTICS TECHNOLOGY CO., LTD., Shanghai (CN)

(72) Inventors: Tingke Song, Shanghai (CN); Xuan Wang, Shanghai (CN); Ran An, Santa Clara, CA (US)

(73) Assignee: SHANGHAI FLEXIV ROBOTICS TECHNOLOGY CO., LTD., Shanghai (CN)

( * ) Notice: Subject to any disclaimer, the term of this patent is extended or adjusted under 35 U.S.C. 154(b) by 58 days.

(21) Appl. No.: 18/030,620

(22) PCT Filed: Dec. 21, 2022

(86) PCT No.: PCT/CN2022/140704
§ 371 (c)(1),
(2) Date: Apr. 6, 2023

(87) PCT Pub. No.: WO2023/116766
PCT Pub. Date: Jun. 29, 2023

(65) Prior Publication Data
US 2024/0369132 A1 Nov. 7, 2024

(30) Foreign Application Priority Data
Dec. 23, 2021 (CN) .......................... 202111588138.4

(51) Int. Cl.
*F16H 57/00* (2012.01)
*B25J 9/10* (2006.01)
(Continued)

(52) U.S. Cl.
CPC .......... *F16H 57/0018* (2013.01); *B25J 9/102* (2013.01); *B25J 9/108* (2013.01);
(Continued)

(58) Field of Classification Search
CPC ....... B25J 9/102; B25J 9/108; F16H 57/0018; F16H 2057/02069; F16H 2057/02091
See application file for complete search history.

(56) References Cited

U.S. PATENT DOCUMENTS 8,375,820 B2 * 2/2013 Tominaga .............. H02K 7/116
74/421 A
2005/0221941 A1 10/2005 Nihei et al.
(Continued)

FOREIGN PATENT DOCUMENTS

CN 111936276 A 11/2020
CN 213511949 U 6/2021
(Continued)

OTHER PUBLICATIONS

International Search Report and Written Opinion for International Application No. PCT/CN2022/140704 mailed Mar. 20, 2023.

*Primary Examiner* — Bobby Rushing, Jr.
(74) *Attorney, Agent, or Firm* — Ballard Spahr LLP

(57) ABSTRACT

A transmission mechanism for a rotary joint, a robot joint and a robot. The transmission mechanism includes a driving member, a transmission member, an output shaft, an input shaft, and a housing. The driving member has a driving end. The transmission member has an output end and an input end. The output shaft is drivingly connected to the output end. The input shaft is drivingly connected to both the driving end and the input end, and sleeved on the output shaft. The housing is arranged around the input shaft. The housing, the input shaft and the output shaft are in a triple nested structure. The implementation of the present disclosure can compress a total length of the joint, save axial (Continued)

space, and make full use of radial space, while satisfying good assembly coaxiality.

18 Claims, 7 Drawing Sheets

(51) Int. Cl.
  *B25J 17/00* (2006.01)
  *F16H 57/021* (2012.01)
  *F16H 57/023* (2012.01)
(52) U.S. Cl.
  CPC ............ *B25J 17/00* (2013.01); *F16H 57/021* (2013.01); *F16H 57/023* (2013.01)

(56) References Cited

U.S. PATENT DOCUMENTS

| | | | |
|---|---|---|---|
| 2009/0178506 A1 | 7/2009 | Yamamoto et al. | |
| 2009/0289591 A1* | 11/2009 | Kassow | B25J 18/00 901/3 |
| 2016/0072366 A1* | 3/2016 | Omata | H02K 7/116 310/68 B |
| 2020/0057044 A1* | 2/2020 | Nakamura | G01N 33/2888 |

FOREIGN PATENT DOCUMENTS

| | | |
|---|---|---|
| CN | 113606313 A | 11/2021 |
| CN | 114278717 A | 4/2022 |
| JP | 2019181623 A | 10/2019 |

\* cited by examiner

TRANSMISSION MECHANISM FOR ROTARY JOINT, ROBOT JOINT AND ROBOT

CROSS-REFERENCE TO PRIOR APPLICATION

This application is a U.S. national stage application of PCT Intenational Application No. PCT/CN2022/140704 filed on Dec. 21, 2022, which claims priority to Chinese Patent Application No. 2021115881384 titled "TRANSMISSION MECHANISM FOR ROTARY JOINT", and filed on Dec. 23, 2021, the disclosure of each of which is incorporated herein by reference in its entirety.

TECHNICAL FIELD

The present application relates to the technical field of automated machinery, and more particularly, to a transmission mechanism for a rotary joint, a robot joint and a robot.

BACKGROUND

Rotary joints are commonly used components in automated machinery such as robots, mechanical arms, and multi-layer rotary body rotation systems. The main parts of the transmission mechanism for the rotary joint are generally arranged sequentially along an axial direction of the joint. For example, the input encoder, input shaft, motor/reducer system, output shaft and output encoder are arranged sequentially along the axial direction of the joint. However, this assembly structure also has obvious drawbacks, such as occupying high axial space occupation and low utilization rate of radial space.

SUMMARY

According to various embodiments of the present disclosure, a transmission mechanism for a rotary joint is provided. The transmission mechanism:
a driving member having a driving end:
a transmission member having an output end and an input end:
an output shaft drivingly connected to the output end:
an input shaft drivingly connected to both the driving end and the input end, and sleeved on the output shaft; and
a housing, arranged around the input shaft.

In an embodiment, the transmission mechanism has opposite first and second sides, both the driving member and the transmission member are arranged on the first side, and the output shaft and the input shaft extend from the first side to the second side.

In an embodiment, ends of the output shaft, the input shaft and the housing are sequentially arranged in a stepped shape at the second side, and the end of the output shaft protrudes relative to the end of the input shaft and the end of the housing.

In an embodiment, the output shaft includes a first transmission shaft and a first mounting shaft, a part of the first transmission shaft close to the first side being drivingly connected to the output end of the transmission member, and a part of the first transmission shaft close to the second side being fixedly connected to the first mounting shaft. The input shaft includes a second transmission shaft and a second mounting shaft, a part of the second transmission shaft close to the first side being drivingly connected to the input end of the transmission member, a part of the second transmission shaft away from the first side being fixedly connected to the second mounting shaft, and the second transmission shaft is drivingly connected to the driving end of the driving member.

In an embodiment, at least a part of the first mounting shaft is inserted into a part of the first transmission shaft close to the second side, and at least a part of the second mounting shaft is inserted into a part of the second transmission shaft close to the second side.

In an embodiment, an outer diameter of the first transmission shaft is greater than an outer diameter of the first mounting shaft, and an inner diameter of the second transmission shaft is less than an inner diameter of the second mounting shaft.

In an embodiment, a first bearing is arranged between the first mounting shaft and the second mounting shaft, and a first blocking shoulder is arranged on an outer wall of the first mounting shaft and configured to limit movement of the first bearing toward the first side.

In an embodiment, a second bearing is arranged between the second mounting shaft and the housing, and a second blocking shoulder is arranged on an inner wall of the housing and configured to limit movement of the second bearing toward the first side.

Another aspect of the present disclosure provides a robot joint including the transmission mechanism according to the above embodiments.

A further aspect of the present disclosure provides a robot including a robot joint according to the above embodiment.

The details of one or more embodiments of the present disclosure are set forth in the accompanying drawings and the description below. Other features, objects and advantages of the present disclosure will become apparent from the description, the accompanying drawings, and the claims.

BRIEF DESCRIPTION OF THE DRAWINGS

To better describe and illustrate embodiments and/or examples disclosed herein, reference may be made to one or more accompanying drawings. Additional details or examples used to describe the accompanying drawings should not be considered as limiting the scope of any of the disclosed application, currently described embodiments and/or examples, and the best modes of the applications currently understood.

DESCRIPTION OF THE REFERENCE NUMERALS

1: robot joint: 10: transmission mechanism: 101: power system: 100: driving member: 110: rotor: 120: stator: 110a: driving end; 200: transmission member: 210:

output end: 220: input end: 300: output shaft: 310: first transmission shaft; 320: first mounting shaft: 321: first end: 322: second end: 330: first blocking shoulder: 340: first annular boss: 400: input shaft: 410: second transmission shaft: 420: second mounting shaft: 421: third end: 422: fourth end: 430: second annular boss: 440: third annular boss: 500: housing: 510: annular groove: 520: fifth end: 530: sixth end: 540: receiving groove: 550: second blocking shoulder: 600: first bearing: 700: second bearing: 101*a*: power system: 300*a*: output shaft: 400*a*: input shaft: 800*a*: input encoder; and 900*a*: output encoder.

DETAILED DESCRIPTION OF THE EMBODIMENTS

In order to make the objects, technical solution and advantages of the present disclosure clearer, the present disclosure will be further described in detail below with reference to the accompanying drawings and embodiments. It should be understood that, the specific embodiments illustrated herein are merely for the purpose of explanation, and should not be deemed to limit the protection scope of the disclosure.

It should be noted that when an element is referred to as being "fastened to" another element, it can be directly fastened to the other element or intervening element may also be present. When an element is considered to be "connected to" another element, it can be directly connected to the other element or intervening element may also be present. The terms "vertical", "horizontal", "left", "right", and the like used herein are for illustrative purposes only and are not intended to be the only example.

All technical and scientific terms used herein have the same meaning as commonly understood by one of ordinary skill in the art to which the present disclosure applies, unless otherwise defined. The terms used in the specification of present disclosure herein are for the purpose of describing specific embodiments only and are not intended to limit the present disclosure. The term "and/or" used herein includes any and all combinations of one or more of the associated listed items.

Figure 1:
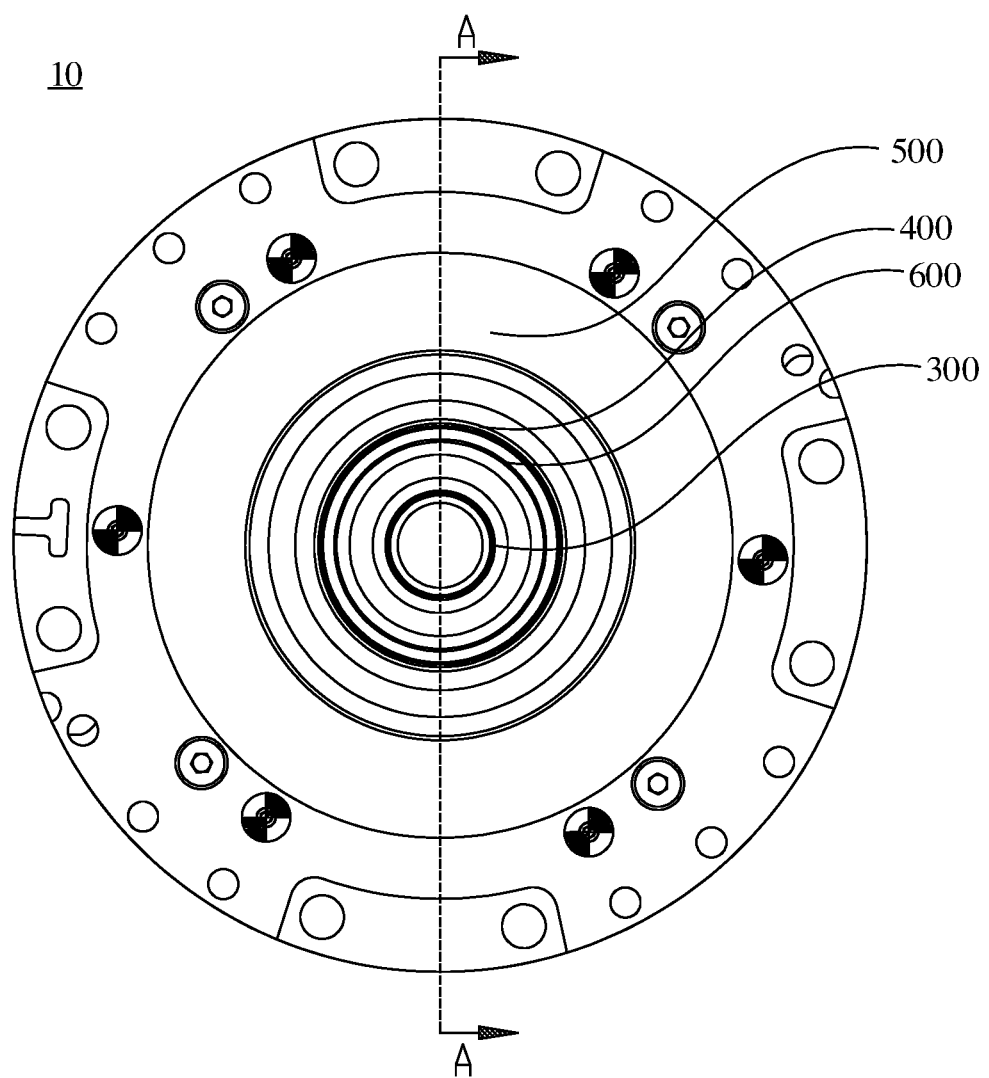
FIG. 1 is a schematic structural diagram illustrating a transmission mechanism according to an embodiment of the present disclosure.
Figure 2:
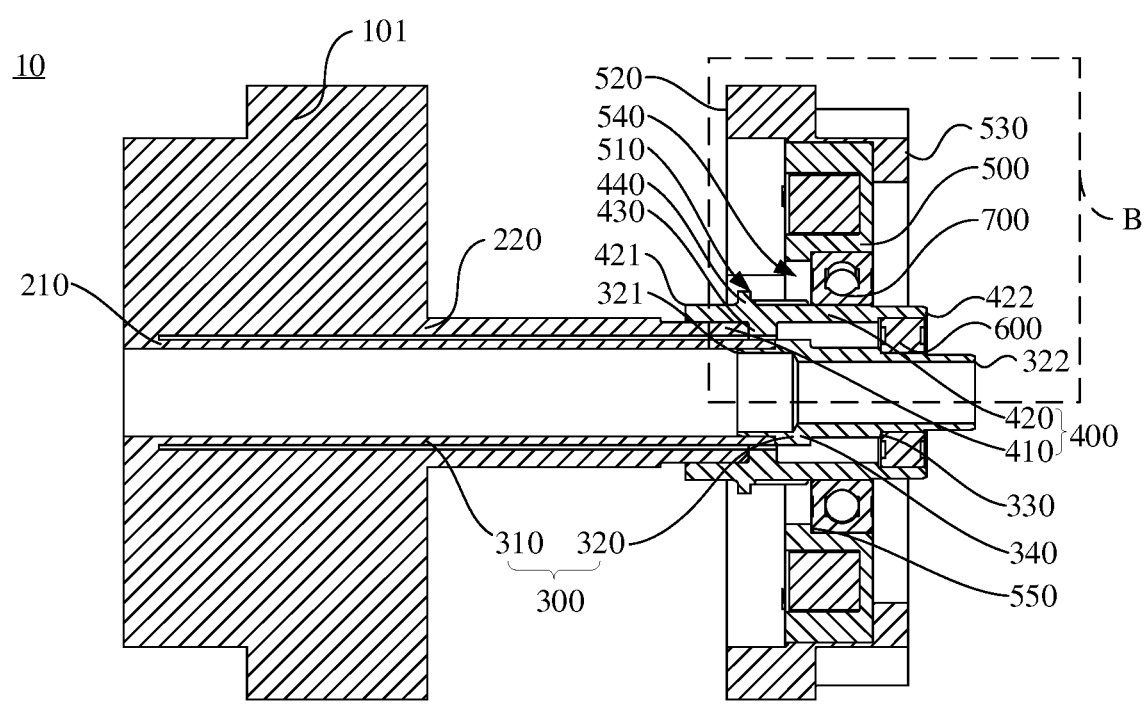
FIG. 2 shows a cross-sectional view of the transmission mechanism taken in FIG. 1 along line A-A.
Figure 5:
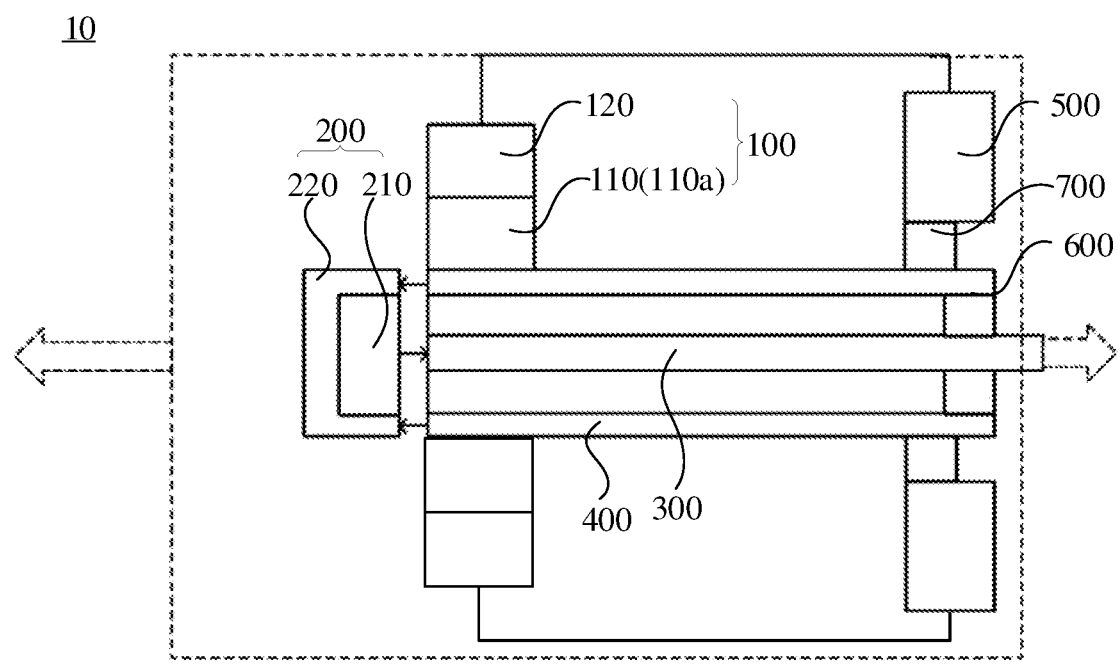
FIG. 5 is a schematic diagram illustrating an internal connection structure of a motor/reducer system in the transmission mechanism shown in FIG. 2.

As shown in FIGS. 1, 2 and 5, a transmission mechanism 10 for a rotary joint is provided in an embodiment of the present disclosure. The transmission mechanism 10 can be applied to related fields and occasions such as robots, mechanical arms, and multi-layer rotary body rotation systems. The transmission mechanism 10 for the rotary joint includes a driving member 100, a transmission member 200, an output shaft 300, an input shaft 400, a housing 500, a first bearing 600 and a second bearing 700. The transmission mechanism 10 for the rotary joint can fully utilize radial space and save axial space while satisfying good assembly coaxiality. The transmission mechanism 10 has opposite first side (for example, left side in FIG. 2) and second side (for example, right side in FIG. 2). Both the driving member 100 and the transmission member 200 are arranged on the first side, and the output shaft 300 and the input shaft 400 extend from the first side to the second side. On one hand, there can be sufficient space on the second side to arrange other components (such as encoder) of the joint, and on the other hand, the input shaft 400 and output shaft 300 will not interfere with the large and complicated components, for example, the driving member 100 (such as motor) and the transmission member 200 (such as reducer).

Specifically, as shown in FIG. 5, the driving member 100 has a driving end 110*a*. In this embodiment, the driving member 100 is a motor that has a stator 120 and a rotor 110, and the rotor 110 acts as the driving end 110*a*. Certainly, in other embodiments, the driving member 100 may also be other driving mechanisms such as an air cylinder, an oil cylinder, and the like.

Specifically, as shown in FIGS. 2 and 5, the transmission member 200 has an output end 210 and an input end 220. In this embodiment, the transmission member 200 is a reducer. Certainly, in other embodiments, the transmission member 200 may also be a transmission mechanism of other forms. In this embodiment, the driving member 100 and the transmission member 200 may be assembled into a power system 101.

Figure 4:
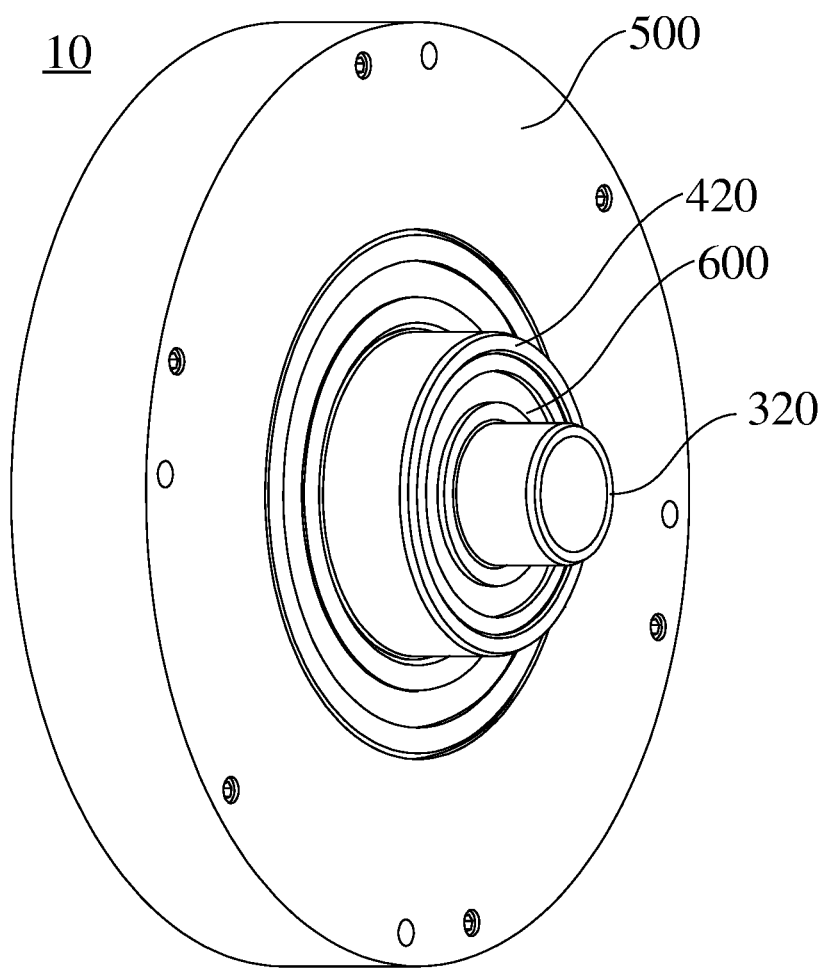
FIG. 4 is a partial perspective diagram illustrating a right part of the transmission mechanism in FIG. 2.

Further, as shown in FIGS. 2 and 4, Both the input shaft 220 and the output shaft 210 are elongated hollow shafts, and a radial clearance between the input shaft 220 and the output shaft 210 may be small. In this embodiment, the input shaft 400 is sleeved on the output shaft 300. As shown in FIG. 5, the output shaft 300 is drivingly connected to the output end 210. The input shaft 400 is drivingly connected to both the driving end 110*a* and the input end 220. In this embodiment, the outer surface of the input shaft 400 engages with the drive end 110*a* through gear engagement. It should be understood, in other embodiments, the input shaft 400 may be in end face connection with the drive end 110*a* (for example, through a connecting flange).

Figure 3:
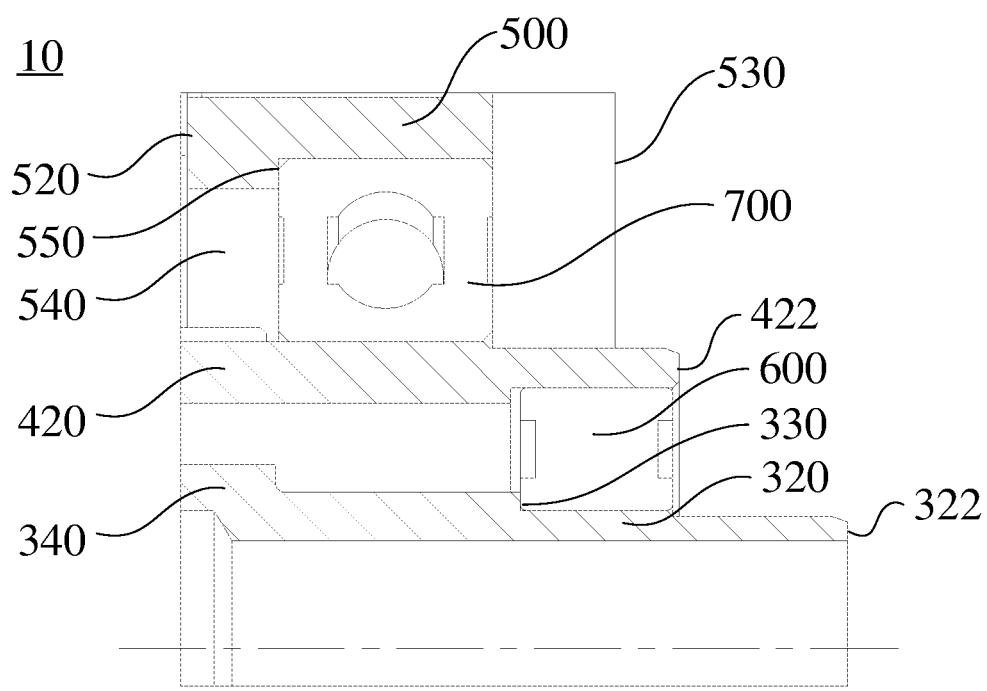
FIG. 3 shows a partial enlarged view of an area B of the transmission mechanism in FIG. 2.

Specifically, as shown in FIGS. 2 and 5, the output shaft 300 includes a first transmission shaft 310 and a first mounting shaft 320. An end of the first transmission shaft 310 is drivingly connected to the output end 210. The first mounting shaft 320 has a first end 321 arranged close to the first side, and a second end 322 arranged close to the second side. The first end 321 is connected to an end of the first transmission shaft 310 away from the first transmission shaft 310. In this way, a low-speed and high-torque power decelerated by the driving member 200 (i.e., reducer) can be output via the output shaft 300. As shown in FIG. 3, an outer wall of the first mounting shaft 320 is provided with a first blocking shoulder 330. In this embodiment, the first blocking shoulder 330 is specifically an annular protrusion disposed on the outer wall of the first mounting shaft 320. As shown in FIGS. 2 and 3, the outer wall of the first mounting shaft 320 is provided with a first annular boss 340, a part of the first mounting shaft 320 having the first end 321 is inserted into the first transmission shaft 310, and an end of the first transmission shaft 310 away from the output end 210 abuts against the first annular boss 340. The first annular boss 340 is closer to the power system 101 (or the transmission member 200) than the first blocking shoulder 330, that is, in FIG. 2, the first annular boss 340 is located on the left side of the first blocking shoulder 330.

Furthermore, as shown in FIGS. 2 and 5, the input shaft 400 includes a second transmission shaft 410 and a second mounting shaft 420. An end of the second transmission shaft 410 is drivingly connected to the input end 220. A side of the second transmission shaft 410 is connected to a rotor 110 of the motor. Specifically, as shown in FIGS. 2 and 5, the second mounting shaft 420 has a third end 421 arranged close to the first side, and a fourth end 422 arranged close to the second side. The third end 421 is connected to an end of the second transmission shaft 410 away from the input end 220. In this way, the input shaft 400 can input the power of the motor with a high speed and a low torque into the reducer. As shown in FIGS. 2 and 3, an inner wall of the second mounting shaft 420 is provided with a second annular boss 430, and the second annular boss 430 is closer to the power system 101 than the first blocking shoulder 330, that is, in FIG. 2, the second annular boss 430 is located on the left side of the first blocking shoulder 330. A part of the second transmission shaft 410 away from the power system 101 is inserted into the second mounting shaft 420. An end of the second transmission shaft 410 away from the input end 220 abuts against the second annular boss 430. In this way, on one hand, the tightness of fit between the second transmission shaft 410 and the second mounting shaft 420 can be improved, and on the other hand, the length of the part of the second transmission shaft 410 inserted into the second mounting shaft 420 can be limited. Certainly, the way of assembling the second transmission shaft 410 and the second mounting shaft 420 is not limited to this way, and the input shaft 400 and the input shaft 220 the second transmission shaft 410 and the second mounting shaft 420 can also be assembled in other ways.

Furthermore, an outer diameter of the first transmission shaft 310 is greater than an outer diameter of the first mounting shaft 320, and an inner diameter of the second transmission shaft 410 is less than an inner diameter of the second mounting shaft 420. In this way, on one hand, there can be sufficient space on the second side to mount the bearings, and on the other hand, the gap between the first mounting shaft 320 and the second mounting shaft 420 may be reduced, which makes the overall structure of the transmission mechanism more compact.

Furthermore, as shown in FIGS. 2 and 3, the housing 500 is in a hollow bucket-like structure. In this embodiment, the housing 500 is arranged around the input shaft 400, and more particularly, arranged around the second mounting shaft 420. Specifically, an inner wall of the housing 500 may be provided with an annular groove 510 that matches the third annular boss 440. When the housing 500 is arranged around the second mounting shaft 420, the third annular boss 440 is inserted into the annular groove 510. In this way, the tightness of fit between the input shaft 400 and the housing 500 can be improved.

The housing 500 has a fifth end 520 and a sixth end 530. The fifth end 520 is arranged close to the first side, and the sixth end 530 is arranged close to the second side. The first end 321, the third end 421 and the fifth end 520 are all located on a side close to the power system 101, and the second end 322, the fourth end 422 and the sixth end 530 are all located on a side away from the power system 101. The housing 500 is stationary and connected to the stator 120. As shown in FIG. 3, the inner wall of the housing 500 is provided with a second blocking shoulder 550. In this embodiment, the second blocking shoulder 550 is specifically an annular protrusion provided on the inner wall of the housing 500. Specifically, the third annular boss 440 is closer to the power system 101 (or the transmission member 200) than the second blocking shoulder 550, that is, in FIG. 2, the third annular boss 440 is located on the left side of the second blocking shoulder 550.

Figure 7:
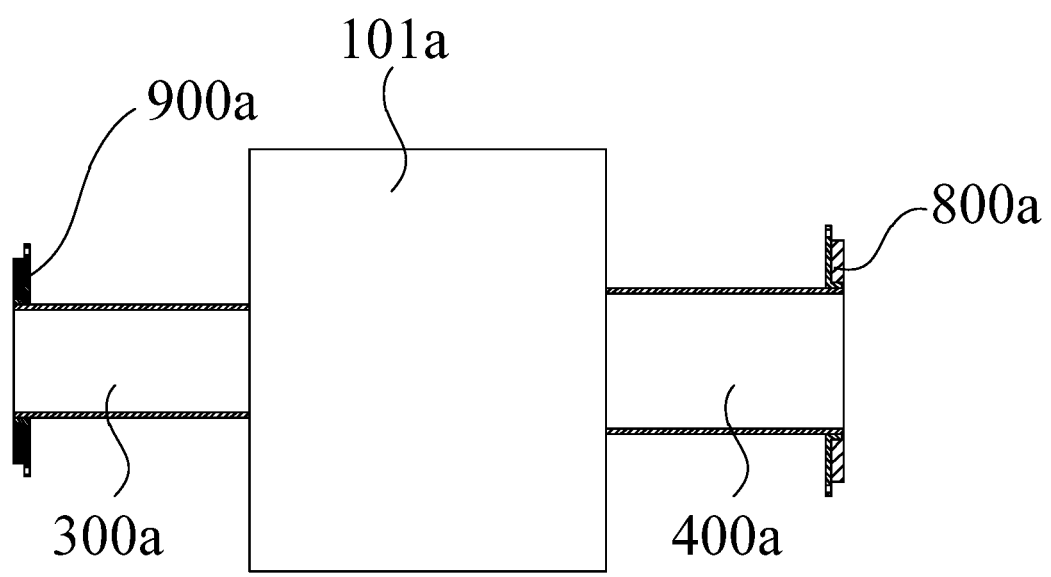
FIG. 7 schematically shows a cross-sectional view of a transmission mechanism in the related art.

In the related art, as shown in FIG. 7, the transmission mechanism 10 for the rotary joint is generally formed by the input shaft 400a, the power system 101a and the output shaft 300a arranged sequentially in the axial direction, and the ends of the input shaft 400a and the output shaft 300a are connected to an input encoder 800a and an output encoder 900a respectively. Such arrangement will take up large axial space and lead to low utilization of radial space. In the present disclosure, the housing 500, the input shaft 400 and the output shaft 300 are in a triple nested structure, which, compared to a traditional arrangement where these elements are linearly distributed along an axial direction from right to left, can compress a total length of the joint, save axial space, and make full use of radial space, while satisfying the good assembly coaxiality.

The power transmission process of the transmission mechanism 10 for the rotary joint proposed in the present disclosure will be specifically described below.

The rotor 110 of the motor rotates, and transmits a high-speed and low-torque power to the reducer through the input shaft 220. The reducer converts the high-speed and low-torque power generated by the motor into a low-speed and high-torque power and transmits it other devices through the output shaft 300. In this way, the power transmission process of the transmission mechanism 10 is completed.

Furthermore, as shown in FIGS. 2 and 3, the second end 322, the fourth end 422 and the sixth end 530 are arranged in a stepped shape. Specifically, a distance between the second end 322 and the power system 101 (or the transmission member 200) is greater than a distance between the fourth end 422 and the power system 101 (or the transmission member 200), and a distance between the fourth end 422 and the power system 101 (or the transmission member 200) is greater than a distance between the sixth end 530 and the power system 101 (or the transmission member 200), that is, the second end 322 protrudes from the plane where the fourth end 422 is located, and the fourth end 422 protrudes from the plane where the sixth end 530 is located. This arrangement facilitates the assembly and disassembly of the housing 500, the first mounting shaft 320 and the second mounting shaft 400. Certainly, in other embodiments, it can also be reversed, the distance between the second end 322 and the power system 101 (or the transmission member 200) is smaller than the distance between the fourth end 422 and the power system 101 (or the transmission member 200), and the distance between the fourth end 422 and the power system 101 (or the transmission member 200) is smaller than the distance between the sixth end 530 and the power system 101 (or the transmission member 200), that is, the fourth end 422 protrudes from the plane where the second end 322 is located, and the sixth end 530 protrudes from the plane where the fourth end 422 is located. In other embodiments, the first end 321, the third end 421 and the fifth end 520 may also be arranged in a stepped shape.

Furthermore, as shown in FIGS. 2 and 3, the first bearing 600 is arranged between the first mounting shaft 320 and the second mounting shaft 420, that is, the first bearing 600 is sleeved on the first mounting shaft 320, and the second mounting shaft 420 is sleeved on the first bearing 600. In this embodiment, the first bearing 600 is located between the first mounting shaft 320 and the second mounting shaft 420 and at an end close to the fourth end 422, and the first blocking shoulder 330 is configured to limit the movement of the first bearing 600 away from the fourth end 422. In this embodiment, when the first bearing 600 is mounted between the first mounting shaft 320 and the second mounting shaft 420, an end of the first bearing 600 abuts against the first blocking shoulder 330, another end of the first bearing 600 is flush with the plane where the fourth end 422 is located, an outer ring of the first bearing 600 abuts against the inner wall of the second mounting shaft 420, and an inner ring of the first bearing 600 abuts against the outer wall of first mounting shaft 320. In this way, the first bearing 600 can be configured to support the sides of the first mounting shaft 320 and the second mounting shaft 420 away from the transmission member 200, while ensuring the independent rotation of the first mounting shaft 320 and the second mounting shaft 420.

In this embodiment, the first bearing 600 is a deep groove ball bearing. The deep groove ball bearing is a kind of rolling bearing whose rolling elements are balls, and is a radial ball bearing in which each ring has a continuous groove track with a cross section approximately one third of the circumference of the ball, which has the characteristics of low friction resistance and high rotation speed, and can be used in parts bearing radial loads or combined loads acting simultaneously in radial and axial directions, and can also be used in parts bearing axial loads. Certainly, in other embodiments, the first bearing 600 may also be other types of bearings.

In some embodiments, as shown in FIGS. 2 and 3, the first bearing 600 is fastened to the outer wall of the first mounting shaft 320 by an adhesive, and the first bearing 600 is fastened to the inner wall of the second mounting shaft 420 by the adhesive, so as to realize the mounting of the first bearing 600 between the output shaft 300 and the input shaft 400. Specifically, 609 glue may be used as the adhesive, which has high bonding strength, and can improve the strength of fit between the first bearing 600 and the output shaft 300 and between the first bearing 600 and the input shaft 400. Certainly, other types of adhesives may also be selected as required. The first bearing 600 may be also arranged between the outer wall of the first mounting shaft 320 and the inner wall of the second mounting shaft 420 by interference fit, so as to realize the mounting of the first bearing 600 between the output shaft 300 and the input shaft 400. In this embodiment, the first bearing 600 is arranged between the outer wall of the first mounting shaft 320 and the inner wall of the second mounting shaft 420 by interference fit, and fastened to the outer wall of the first mounting shaft 320 and the inner wall of the second mounting shaft 420 by the adhesive. In this way, the strength of fit between the first bearing 600 and the first mounting shaft 320 and between the first bearing 600 and the second mounting shaft 420 can be ensured.

Furthermore, as shown in FIGS. 2 and 3, the second bearing 700 is arranged between the second mounting shaft 420 and the housing 500, that is, the second bearing 700 is sleeved on the second mounting shaft 420, and the housing 500 is sleeved on the second bearing 700. In this embodiment, the second bearing 700 is located between the second mounting shaft 420 and the housing 500 and at an end close to the sixth end 530, and the second blocking shoulder 550 is configured to limit the movement of the second bearing 700 away from the sixth end 530. Specifically, an annular receiving groove 540 may be provided on the inner wall of the housing 500, and the second blocking shoulder 550 may be provided on a bottom wall of the receiving groove 540. When the second bearing 700 is mounted between the second mounting shaft 420 and the housing 500, the second bearing 700 is inserted into the receiving groove 540, an end of the second bearing 700 abuts against the second blocking shoulder 550, another end of the second bearing 700 is flush with one side wall of the receiving groove 540, the outer ring of the second bearing 700 abuts against the bottom wall of the receiving groove 540, and the inner ring of the second bearing 700 abuts against the outer wall of the second mounting shaft 420. In this way, the second bearing 700 can be configured to support the sides of the second mounting shaft 420 and the housing 500 away from the transmission member 200, while ensuring the rotation of the second mounting shaft 420 relative to the housing 500. Certainly, the way of installing the second bearing 700 is not limited to this way, and the second bearing 700 can also be mounted in other ways.

In this embodiment, the second bearing 700 may be a deep groove ball bearing. Certainly, in other embodiments, the second bearing 700 may also be other types of bearings. In this embodiment, the second bearing 700 is a deep groove ball bearing with a larger size than the first bearing 600, so as to accommodate a case where the radial distance between the housing 500 and the second mounting shaft 420 is greater than the radial distance between the second mounting shaft 420 and the first mounting shaft 320. Certainly, in other embodiments, the first bearing 600 and the second bearing 700 may also be deep groove ball bearings of the same size and type as required.

In some embodiments, as shown in FIGS. 2 and 3, the second bearing 700 is fastened to the outer wall of the second mounting shaft 420 by the adhesive, and the second bearing 700 is fastened to the inner wall of the housing 500 are by the adhesive, so as to realize the installation of the second bearing 700 between the second mounting shaft 420 and the housing 500. Specifically, 609 glue is used as the adhesive, which has high bonding strength, and can improve the strength of fit between the second bearing 700 and the second mounting shaft 420 and between the second bearing 700 and the housing 500. Certainly, other types of adhesives may also be selected as required. The second bearing 700 may be also arranged between the outer wall of the second mounting shaft 420 and the inner wall of the housing 500 by interference fit, so as to realize the installation of the second bearing 700 between the second mounting shaft 420 and the housing 500. In this embodiment, the second bearing 700 may be also arranged between the outer wall of the second mounting shaft 420 and the inner wall of the housing 500 by interference fit, and fastened to the outer wall of the second mounting shaft 420 and the inner wall of the housing 500 by the adhesive. In this way, the strength of fit between the second bearing 700 and the second mounting shaft 420 and between the second bearing 700 and the housing 500 can be ensured.

The assembly and disassembly processes of the transmission mechanism 10 for the rotary joint proposed in the present disclosure will be specifically described below.

During assembling, the first end 321 of the first mounting shaft 320 is first mounted on the first transmission shaft 310, and the third end 421 of the second mounting shaft 420 is mounted on the second transmission shaft 410. Then, the first bearing 600 is press-fitted between the first mounting shaft 320 and the second mounting shaft 420 from the right side in FIG. 2, i.e., the side of the triple nested structure away from the power system 101 (or the transmission member 200), so that an end of the first bearing 600 abuts against the first blocking shoulder 330, and another end of the first bearing 600 is flush with the plane where the fourth end 422 is located. The first bearing 600 is bonded to the outer wall of the first mounting shaft 320 and the inner wall of the second mounting shaft 420 by the adhesive, while the first bearing 600 is fastened to the outer wall of the first mounting shaft 320 and the inner wall of the second mounting shaft 420 by interference fit. After that, the second bearing 700 is press-fitted into the receiving groove 540 of the housing 500, so that an end of the second bearing 700 abuts against the second blocking shoulder 550 and another end of the second bearing 700 is flush with one side wall of the receiving groove 540. The second bearing 700 is bonded and fastened to the inner wall of the housing 500 by the adhesive. Finally, the housing 500 and the second bearing 700 are arranged around and mounted outside the second mounting shaft 420. The second bearing 700 is bonded and fastened to the outer wall of the second mounting shaft 420 by the adhesive. Meanwhile, the second bearing 700 is fastened to the outer wall of the second mounting shaft 420 and the inner wall of the housing 500 by interference fit. In this way, the assembly process of the transmission mechanism 10 for the rotary joint is completed. In the case where the second bearing 700 is first press-fitted onto the housing 500, and the combination of the second bearing 700 and the housing 500 is then mounted on the second mounting shaft 420, since it is only necessary to consider the fit between the second bearing 700 and the outer wall of the second mounting shaft 420, the assembly gap error can be reduced and the assembly difficulty can also be reduced.

During disassembling, the combination of the housing 500 and the second bearing 700 may be disassembled from the second mounting shaft 420 first, and then the second mounting shaft 420 may be disassembled from the second transmission shaft 410 by using a specific jig, and meanwhile the first bearing 600 may be disassembled from the first mounting shaft 320. Finally, the first mounting shaft 320 may be disassembled from the first transmission shaft 310 by using a specific jig.

Since the sides of the housing 500, the second mounting shaft 420 and the first mounting shaft 320 away from the reducer (i.e., the second end 320, the fourth end 422 and the sixth end 530) are arranged in a stepped shape, it is convenient for the layer-by-layer assembling of the housing 500, the second mounting shaft 420 and the first mounting shaft 320, and also facilitates the layer-by-layer disassembling of the housing 500, the second mounting shaft 420 and the first mounting shaft 320, and in particular, it is convenient for the special fixture to hold the parts that need to be disassembled. Moreover, the overall structure is compact and the appearance is small, which is easy to integrate into other structures.

Furthermore, the arrangement of the first bearing 600 and the second bearing 700 not only realizes the independent rotation of the second mounting shaft 420 and the first mounting shaft 320, that is, the independent rotation of the output shaft 300 and the input shaft 400, but also realizes reliable and rigid support in the radial direction for the output shaft 300, the input shaft 400 and the housing 500.

Furthermore, the first bearing 600 and the second bearing 700 are fastened between the first mounting shaft 320 and the second mounting shaft 420 and between the second mounting shaft 420 and the housing 500 respectively by means of adhesive in combination with interference fit, and the first blocking shoulder 330 and the second blocking shoulder 550 are used to limit the position without additional fastening or limiting components, which greatly simplifies the triple nested structure and reduces the manufacturing difficulty and cost.

Figure 6:
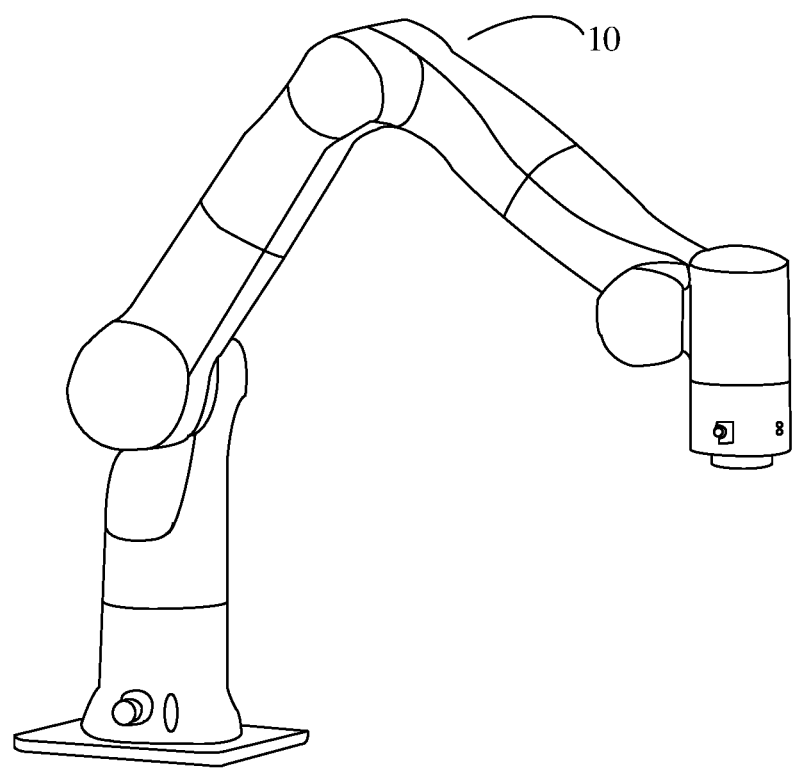
FIG. 6 is a schematic structural diagram illustrating a robot according to an embodiment of the present disclosure.

As shown in FIG. 6, a robot joint 1 is provided in an embodiment of the present disclosure. The robot joint 1 includes the transmission mechanism 10 described in any one of the above embodiments.

As shown in FIG. 6, a robot is also provided in an embodiment of the present disclosure. The robot includes at least one robot joint 1 described above.

The above-mentioned transmission mechanism 10 for the rotary joint has at least the following beneficial effects.

In this transmission mechanism 10, as shown in FIGS. 2 and 5, the input shaft 400 is drivingly connected to the driving end 110*a* and the input end 220, so that the kinetic energy output from the driving end 110*a* of the driving member 100 is transmitted to the input end of the transmission member 200 through the input shaft 400; and the output shaft 300 is drivingly connected to the output end 210, so as to output the kinetic energy of the transmission member 200, thereby realizing the transmission of kinetic energy from the driving member 100 to the transmission member 200. The triple nested structure of the housing 500, the input shaft 400 and the output shaft 300, compared to the traditional arrangement where these components are linearly distributed along the axial direction from right to left, can compress the total length of the joint, for example, reduce the length of the triple nested structure to less than 20 mm, while satisfying good assembly coaxiality. And compared to the traditional arrangement where these components are linearly distributed along the axial direction, about 26% of the axial space is saved, and the radial space is fully utilized.

Each of the technical features of the above-mentioned embodiments may be combined arbitrarily. To simplify the description, not all the possible combinations of each of the technical features in the above embodiments are described. However, all of the combinations of these technical features should be considered as within the scope of this disclosure, as long as such combinations do not contradict with each other.

The above embodiments merely illustrate several embodiments of the present disclosure, and the description thereof is specific and detailed, but it shall not be construed as limiting the scope of the present disclosure. It should be noted that a plurality of variations and modifications may be made by those skilled in the art without departing from the scope of this disclosure, which are all within the scope of protection of this disclosure. Therefore, the protection scope of this disclosure shall be subject to the appended claims.

What is claimed is:

1. A transmission mechanism for a rotary joint, the transmission mechanism comprising:
   a driving member having a driving end;
   a transmission member having an output end and an input end;
   an output shaft drivingly connected to the output end;
   an input shaft drivingly connected to both the driving end and the input end, and sleeved on the output shaft; and
   a housing arranged around the input shaft;
   wherein the transmission mechanism has a first side and a second side opposite to each other, both the driving member and the transmission member are arranged on the first side, and the output shaft and the input shaft extend from the first side to the second side;
   wherein the output shaft includes a first transmission shaft and a first mounting shaft, the input shaft includes a second transmission shaft and a second mounting shaft, at least a portion of the first mounting shaft is inserted into a part of the first transmission shaft closer to the second side than to the first side, and at least a part of the second mounting shaft is inserted into a part of the second transmission shaft closer to the second side than to the first side.

2. The transmission mechanism of claim 1, wherein ends of the output shaft, the input shaft and the housing are sequentially arranged in a stepped shape at the second side, and the end of the output shaft protrudes relative to the end of the input shaft and the end of the housing.

3. The transmission mechanism of claim 1, wherein a part of the first transmission shaft closer to the first side being drivingly connected to the output end of the transmission member, and a part of the first transmission shaft closer to the second side being fixedly connected to the first mounting shaft; and
   wherein a part of the second transmission shaft closer to the first side being drivingly connected to the input end of the transmission member, a part of the second transmission shaft away from the first side being fixedly connected to the second mounting shaft, and the second transmission shaft is drivingly connected to the driving end of the driving member.

4. The transmission mechanism of claim 3, wherein an outer diameter of the first transmission shaft is greater than an outer diameter of the first mounting shaft, and an inner diameter of the second transmission shaft is less than an inner diameter of the second mounting shaft.

5. The transmission mechanism of claim 3, wherein a first bearing is arranged between the first mounting shaft and the second mounting shaft, and a first blocking shoulder is arranged on an outer wall of the first mounting shaft and configured to limit movement of the first bearing toward the first side.

6. The transmission mechanism of claim 5, wherein the first bearing is fastened to both the outer wall of the first mounting shaft and an inner wall of the second mounting shaft by adhesive.

7. The transmission mechanism of claim 5, wherein the first bearing is mounted between the outer wall of the first mounting shaft and an inner wall of the second mounting shaft by interference fit.

8. The transmission mechanism of claim 5, wherein the first bearing is a deep groove ball bearing.

9. The transmission mechanism of claim 3, wherein a second bearing is arranged between the second mounting shaft and the housing, and a second blocking shoulder is arranged on an inner wall of the housing and configured to limit movement of the second bearing toward the first side.

10. The transmission mechanism of claim 9, wherein the second bearing is fastened to both an outer wall of the second mounting shaft and the inner wall of the housing by adhesive.

11. The transmission mechanism of claim 9, wherein the second bearing is mounted between an outer wall of the second mounting shaft and the inner wall of the housing by interference fit.

12. The transmission mechanism of claim 9, wherein the second bearing is a deep groove ball bearing.

13. The transmission mechanism of claim 3, wherein the housing is arranged around the second mounting shaft; and
wherein the second mounting shaft is provided with an annular boss, and the housing is provided with an annular groove matching the annular boss.

14. The transmission mechanism of claim 1, wherein the transmission member is a reducer.

15. The transmission mechanism of claim 1, wherein the driving member is a motor.

16. The transmission mechanism of claim 15, wherein the motor comprises a stator and a rotor, the rotor acts as the driving end, and the housing is connected to the stator.

17. A robot joint comprising the transmission mechanism of claim 1.

18. A robot comprising the robot joint of claim 17.

* * * * *